United States Patent
Bernhardt et al.

(10) Patent No.: US 11,497,219 B2
(45) Date of Patent: Nov. 15, 2022

(54) DEVICE AND METHOD FOR FORMING DOUGH PIECES

(71) Applicant: FRITSCH Bakery Technologies GmbH & Co. KG, Markt Einersheim (DE)

(72) Inventors: Udo Bernhardt, Iphofen (DE); Rainer Wagner, Martinsheim (DE)

(73) Assignee: FRITSCH BAKERY TECHNOLOGIES GMBH & CO. KG, Markt Einersheim (DE)

( * ) Notice: Subject to any disclaimer, the term of this patent is extended or adjusted under 35 U.S.C. 154(b) by 280 days.

(21) Appl. No.: 16/704,779

(22) Filed: Dec. 5, 2019

(65) Prior Publication Data
US 2020/0196615 A1 Jun. 25, 2020

(30) Foreign Application Priority Data
Dec. 19, 2018 (EP) .................................. 18213815

(51) Int. Cl.
*A21C 9/08* (2006.01)
*A21C 3/06* (2006.01)
*A21C 3/08* (2006.01)

(52) U.S. Cl.
CPC ............... *A21C 9/088* (2013.01); *A21C 3/06* (2013.01); *A21C 3/08* (2013.01)

(58) Field of Classification Search
CPC .............. A21C 3/06; A21C 3/08; A21C 9/088
See application file for complete search history.

(56) References Cited

U.S. PATENT DOCUMENTS

| 3,315,618 | A | * | 4/1967 | Groff | A21C 11/002 |
| | | | | | 264/339 |
| 9,101,145 | B2 | * | 8/2015 | Bernhardt | A21C 9/088 |
| 9,173,410 | B2 | * | 11/2015 | Kuperman | A21C 9/063 |
| 9,801,390 | B2 | * | 10/2017 | Harada | A21D 13/80 |
| 2014/0335214 | A1 | | 11/2014 | Kuperman et al. | |
| 2015/0099049 | A1 | * | 4/2015 | Harada | A21D 13/80 |
| | | | | | 425/319 |

FOREIGN PATENT DOCUMENTS

| DE | 102010027622 A1 | | 11/2011 | | |
| EP | 0490190 A1 | * | 6/1992 | ............. | A21C 9/088 |
| EP | 0490190 A1 | | 6/1992 | | |
| EP | 2856880 A1 | | 4/2015 | | |
| GB | 2174036 B | * | 7/1989 | ............. | A21C 9/088 |

OTHER PUBLICATIONS

Search Report, dated Apr. 11, 2019, 8 pages, Germany.

* cited by examiner

*Primary Examiner* — Seyed Masoud Malekzadeh
(74) *Attorney, Agent, or Firm* — Brooks Kushman P.C.

(57) ABSTRACT

The present disclosure relates to a device for forming a substantially straight, in particular wound, dough piece into an annular shape, comprising a bending unit for annularly bending the dough piece. The bending unit may comprise at least one retaining jaw, two movably supported shaping jaws, a lifting device and a stamp. While being in engagement with the dough piece, one of the shaping jaws provided with a projection is displaceable along a displacement path section between an initial position, in which the projection is in contact with a lower surface of the dough piece, and a final position, in which the projection has been brought out of engagement with the dough piece.

20 Claims, 10 Drawing Sheets

DEVICE AND METHOD FOR FORMING DOUGH PIECES

BACKGROUND OF THE INVENTION

The present invention relates to a device and a method for forming substantially straight, in particular wound, dough pieces in production processes for bakery products that are annular in shape, in particular croissants, according to the preamble of claim 1. A device for forming dough pieces, in particular croissants, is known e.g. from DE 10 2010 027 622 A1. In the case of this device, the ends of the dough pieces are fixed by means of two grippers and bent annularly around a retaining jaw. In so doing, one of the two grippers is vertically lifted by means of a lifting device, so as to be able to arrange the ends of the dough piece in an overlapping mode. When the two ends have been arranged with a suitable overlap, they are additionally pressed together at the ends by means of a stamp in order to prevent the dough piece from re-straightening during baking and from thus losing its annular shape.

The disadvantage of this device is that the ends of the dough piece are not guided and therefore do not maintain an exact position. In addition, no defined inner diameter of the annularly bent dough pieces is ensured.

Another device for annularly bending dough pieces, in particular croissants, is known from EP 0 490 190 A1. Also in the case of this device, one end of the dough piece is lifted during bending so that the ends can be arranged in an overlapping mode once the annular shape has been accomplished. For lifting the end of the dough piece, a projection is provided on one of the two bending arms, the projection entering into engagement below the end of the dough piece. Also in this device, the overlapping ends are subsequently pressed together by means of a stamp in order to fix them together.

The disadvantage of this device is that the overlapping ends are not fixed sufficiently. In addition, especially very small dough pieces, such as mini croissants, cannot be bent making use of this device.

Taking this prior art as a basis, it is therefore the object of the present invention to suggest a device for bending dough pieces, in which the overlapping ends of the dough piece are reliably fixed and which, in particular, can be used for reliably processing even small dough pieces. In addition, it is the object of the present invention to suggest a method for bending dough pieces into an annular shape.

These objects are achieved by a device and a method according to the teaching of the independent main claims. Advantageous embodiments of the present invention are the subject matter of the respective dependent claims.

SUMMARY OF THE INVENTION

A detailed analysis of the known bending devices used for producing annularly bent dough pieces has shown that the insufficient fixing of the overlapping ends of the dough piece is caused by the fact that the projection provided on one bending arm and used for lifting the end of the dough piece is still arranged between the two ends when the two overlapping ends are pressed together, since, due to this arrangement of the projection between the two overlapping ends, fixing can only take place inadequately because large areas of the opposed faces of the two overlapping ends do not come into contact with one another, but are separated by the projection between them. The resultant reduction in size of the contact surface, which is effective for fixing and on which the dough surfaces of the two opposed dough ends are pressed together, impairs the fixing result accordingly. The present invention is therefore configured such that the retaining jaw with the projection provided for lifting the dough end is moved along a special displacement path section between an initial position and a final position while being in engagement with the dough piece. At the initial position, the projection is in contact with the lower surface of the dough piece, so that the respective end of the dough piece can be lifted vertically by lifting the projection and an overlapping positioning of the two overlapping ends can be realized in this way. It goes without saying that, according to the routine course of action, the projection will be in contact with the lower surface of the dough piece not only at the initial position of the displacement path section but also, beginning at the initial position, along a large portion of the displacement path section. The device according to the present invention is characterized in that, at the final position, at which the dough piece is fully bent and the two ends overlap each other, the projection has been brought out of engagement with the dough piece. Hence, this means in other words that, when the projection used for lifting the end has reached the final position, it will no longer be in contact with the lower surface of the dough piece, so that, when the two overlapping ends of the dough piece are pressed against each other by the stamp, the fixing of the dough surfaces of the two ends will no longer be interfered with by the projection on one of the retaining jaws. It follows that the basic idea underlying the device according to the present invention is that the projection provided on the retaining jaw is guided along a displacement path in such a way that, initially, it will be able to lift the end of the dough piece and that, subsequently, as soon as the lifted end of the dough piece is already supported by the dough piece end located therebelow, it will be disengaged so as not to impair the subsequent pressing together of the two ends by means of the stamp. In which way the special displacement path with the desired displacement of the projection on the retaining jaw is realized is, in principle, arbitrary. It will be particularly advantageous when the projection protrudes at the free end of the retaining jaw, so that, at the initial position, the projection will extend transversely to the center axis of the dough piece. Through a respective pivot motion of the retaining jaw about a bearing axis, the free end of the retaining jaw can then be pivoted and, in so doing, shifted along the dough piece such that the free end of the retaining jaw with the projection protruding therefrom will extend parallel to the center axis of the dough piece at the final position, so that, as a result, the projection will no longer be located between the two overlapping ends of the dough piece.

A further advantage of the device according to the present invention is that the device can be lowered completely onto the conveyor belt. During the bending process, the device moves along with the conveyor belt in the conveying direction of the dough piece. Since no grippers are required for gripping the ends of the dough piece, the operational safety will be higher. In addition, an improved shaping of the dough piece is accomplished by guiding/holding the dough piece until the ends have been fully shaped and fixed.

In order to realize the most accurate possible guidance of the two ends during the bending process and in particular during stamping of the two overlapping ends, a preferred device variant is configured such that, at a final position, the distance between the shaping jaws, which are in contact with the dough piece, on the one hand and the back of the retaining jaw on the other corresponds precisely to the width of the ends of the dough piece. As a result, the ends of the dough piece will be guided in a form-fit manner between the shaping jaws on the one hand and the retaining jaws on the other. In addition, it will be ensured that the overlapping ends of the dough piece will not shift horizontally relative to each other during the subsequent stamping.

Optimum guidance of the overlapping ends of the dough piece is accomplished, when the two shaping jaws are arranged one above the other at the final position.

According to the present invention, it is necessary that the projection, which is provided on one of the shaping jaws and by means of which one end of the dough piece is lifted, is moved, during the displacement path section along which the dough piece is annularly bent, from an engagement position, where it is in contact with the lower surface of the dough piece, to a position of non-engagement, where it is out of engagement with the dough piece. For realizing such a displacement path section, it will often not suffice when the shaping jaw enters into engagement with a point on the dough piece following the dough-piece bending process. Instead, such a displacement path section can be realized much more easily, when the shaping jaw rolls or slides on the surface of the dough piece during the displacement path section, i.e. during the engagement for the purpose of bending the dough piece. In order to allow such a rolling or sliding movement of the shaping jaw relative to the surface of the dough piece during the bending process without damaging the surface of the dough piece, it will be particularly advantageous to provide a sliding surface on each of the shaping jaws. The shaping jaw, in particular the shaping jaw having provided thereon the projection for lifting the dough piece, enters into engagement with the dough piece with the sliding surface thereof during the bending process, so that the shaping jaw will then be able to slide or roll on the surface of the dough piece along the displacement path section.

During the process of annularly bending the initially straight dough pieces, it is desired that the shaping jaws should slide or roll with their sliding surfaces on the dough surface. During the shaping-jaw opening process, which is executed after the dough pieces have been bent into an annular shape, such sliding or rolling of the sliding surfaces of the shaping jaws on the dough surface is, however, undesirable, since this will unnecessarily damage the dough surface. In order to prevent this, the shaping jaws may each be bipartite. The second part of the shaping jaws can here be pivoted relative to the first part of the shaping jaw by means of a drive unit. The respective second parts of the shaping jaws have provided thereon the sliding surfaces for engagement with the dough piece. During the shaping-jaw opening process, which is executed after the dough pieces have been bent into an annular shape, it will thus be possible to pivot the second part of the shaping jaws outwards, without displacing the first part, so that the sliding surfaces will be lifted from the dough surface without any sliding movement.

In order to allow, as disclosed by the present invention, the projection on the retaining jaw, by means of which one end of the dough piece is lifted, to be displaced between an engagement position and a position of non-engagement, special displacement path geometries are necessary. On the basis of these displacement path geometries it is often not possible to realize the whole bending process of the straight dough piece until the desired annular shape of the latter is accomplished. In these cases, it will be advantageous when the bending unit comprises two additional pre-shaping jaws, which are each adapted to enter into engagement with the outer side of the dough piece. By driving the pre-shaping jaws, the straight dough piece can then first be bent round the retaining jaw into a bow shape. Subsequently, the actual shaping jaws are brought into engagement with the dough piece and, by displacing the shaping jaws, the dough piece, which has been pre-bent into a bow shape, is bent into the desired annular final shape with the overlapping ends.

The structural design of the retaining jaw is, in principle, arbitrary. The retaining jaw may, for example, be round, the diameter of the retaining jaw corresponding to the desired opening of the annularly bent dough piece. A round or triangular cross-section of the holding jaw proved to be particularly advantageous, with the center of the straight dough piece coming to lie against a rounded tip of the triangular retaining jaw. As a result, such a triangular retaining jaw allows a highly effective preforming and final annular forming of the dough piece by displacing the pre-shaping jaws and the shaping jaws, respectively.

Through the bending of the dough piece, the ends are placed annularly around the retaining jaw, so that the dough piece will finally surround the retaining jaw in the annular shape. In order to allow the retaining jaw to be released, e.g. by vertically pulling out the retaining jaw, without damaging the dough piece, it will be particularly advantageous, when the retaining jaw tapers in a downward direction. For this purpose, the retaining jaw may e.g. be conical in shape. Due to the tapering shape, the surface of the retaining jaw can be detached easily from the dough surface, so that the dough piece can definitely not be damaged when the retaining jaw is retracted. In order to be able to produce dough pieces of different sizes on the same machine, it will be particularly advantageous, when the shaping jaws and/or the retaining jaw are replaceably fixed to the bending unit. The device can then also be adapted to dough pieces of different sizes by replacing the shaping jaws and/or the retaining jaw and/or the stamp and/or the pre-shaping jaws in a suitable manner. The replacement of the shaping jaws and/or the retaining jaw and/or the stamp and/or the pre-shaping jaws can also be accomplished by replacing the bending device in its entirety.

For trouble-free processing of the dough pieces during annular bending, it is very important to insert the dough pieces into the device in a suitably positioned manner, so that the retaining jaw will enter into contact with the dough pieces approximately centrally. In order to accomplish this without manual intervention, it will be of advantage when the device comprises a position sensor, in particular a picture camera, with an evaluation unit. This position sensor system then allows to detect the position of the dough pieces on the conveyor belt and, depending on the position detected, the entire device for bending the dough pieces into an annular shape can then be positioned accordingly. The dough piece will then be received centrally in the device.

The bending method for forming dough pieces according to the present invention is, in turn, characterized in that the projection provided on one of the retaining jaws and used for lifting the end of the dough piece is displaced along a displacement path section. This displacement path section is characterized in that, at the initial position, at which the shaping jaw enters into engagement with the dough piece, the projection is in contact with the lower surface of the dough piece, thus allowing the end of the dough piece to be lifted at the beginning of the displacement path section. In addition, the displacement path section is characterized in that the projection provided on the shaping jaw has definitely been brought out of engagement with the dough piece at the final position and is therefore no longer located between the two ends of the dough piece. In this way, the projection can be prevented from interfering when the two overlapping ends are pressed together.

Preferably, the shaping jaw having the projection attached thereto should, while being in bending engagement, slide along and/or roll on the surface of the dough piece with at least one sliding surface thereof.

It will also be of advantage when the straight dough piece need not be annularly bent by the shaping jaws alone, but when, instead, two pre-shaping jaws are additionally provided, by means of which the straight dough piece can be pre-bent in a bow shape. Only then will the dough piece, which has been pre-bent into a bow shape, be annularly bent around the retaining jaw by means of the two shaping jaws.

According to a preferred method variant, the shaping jaws are moved apart, starting from the final position, during displacement of the stamp, so as to prevent the dough from being horizontally pressed against the inner side of the shaping jaws in an undesirable manner.

During the process of annularly bending the initially straight dough pieces, it is desired that the shaping jaws should slide or roll with their sliding surfaces on the dough surface. During the shaping-jaw opening process, which is executed after the dough pieces have been bent into an annular shape, such sliding or rolling of the sliding surfaces of the shaping jaws on the dough surface is, however, undesirable, since this will unnecessarily damage the dough surface. In order to prevent this, the shaping jaws may each be bipartite. The second part of the shaping jaws can here be pivoted relative to the first part of the shaping jaw by means of a drive unit. The respective second parts of the shaping jaws have provided thereon the sliding surfaces for engagement with the dough piece. The second part of the shaping jaws can thus, in particular during the displacement of the stamp, be pivoted outwards, without displacing the first part, so that the sliding surfaces will be lifted from the dough surface without any sliding movement.

BRIEF DESCRIPTION OF THE SEVERAL VIEWS OF THE DRAWINGS

An embodiment of the present invention is shown schematically in the drawings and will be explained hereinafter as an example.

DETAILED DESCRIPTION OF THE INVENTION

Figure 1:
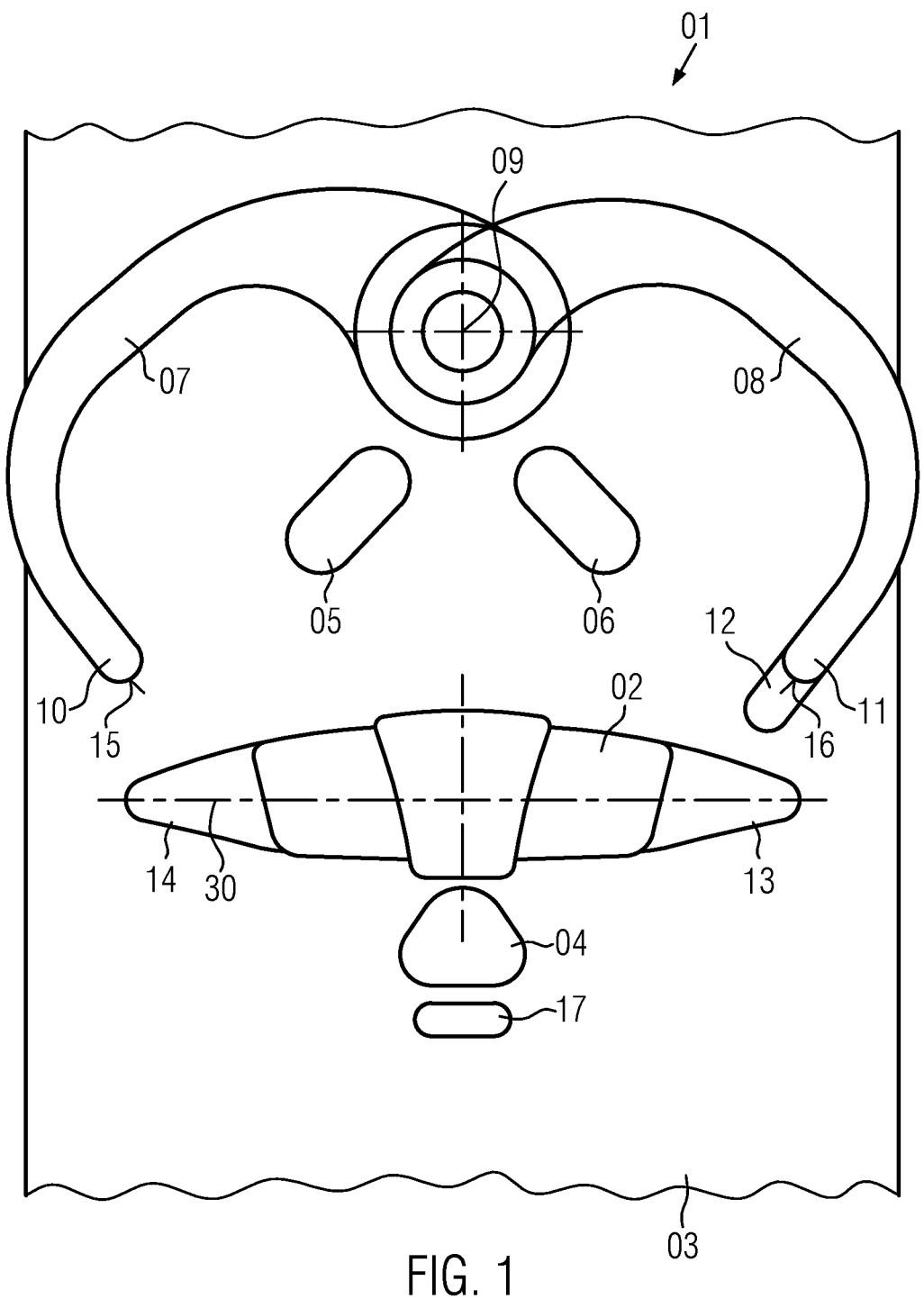
FIG. 1 shows, in a top view, a device according to the present invention before the bending process starts.

FIG. 1 shows a device 01 for annularly bending dough pieces 02, e.g. wound croissants. The drawings according to FIG. 1 to FIG. 5 only show the components of the device 01 which are necessary for making the present invention understandable. According to the representation shown in FIG. 1, the dough pieces 02 wound straight about a center axis 30 are first conveyed, resting on a conveyor belt 03, in the direction of the retaining jaw 04. Two pre-shaping jaws 05 and 06 and two shaping jaws 07 and 08 are still out of engagement with the dough piece 02 at this moment.

Figure 2:
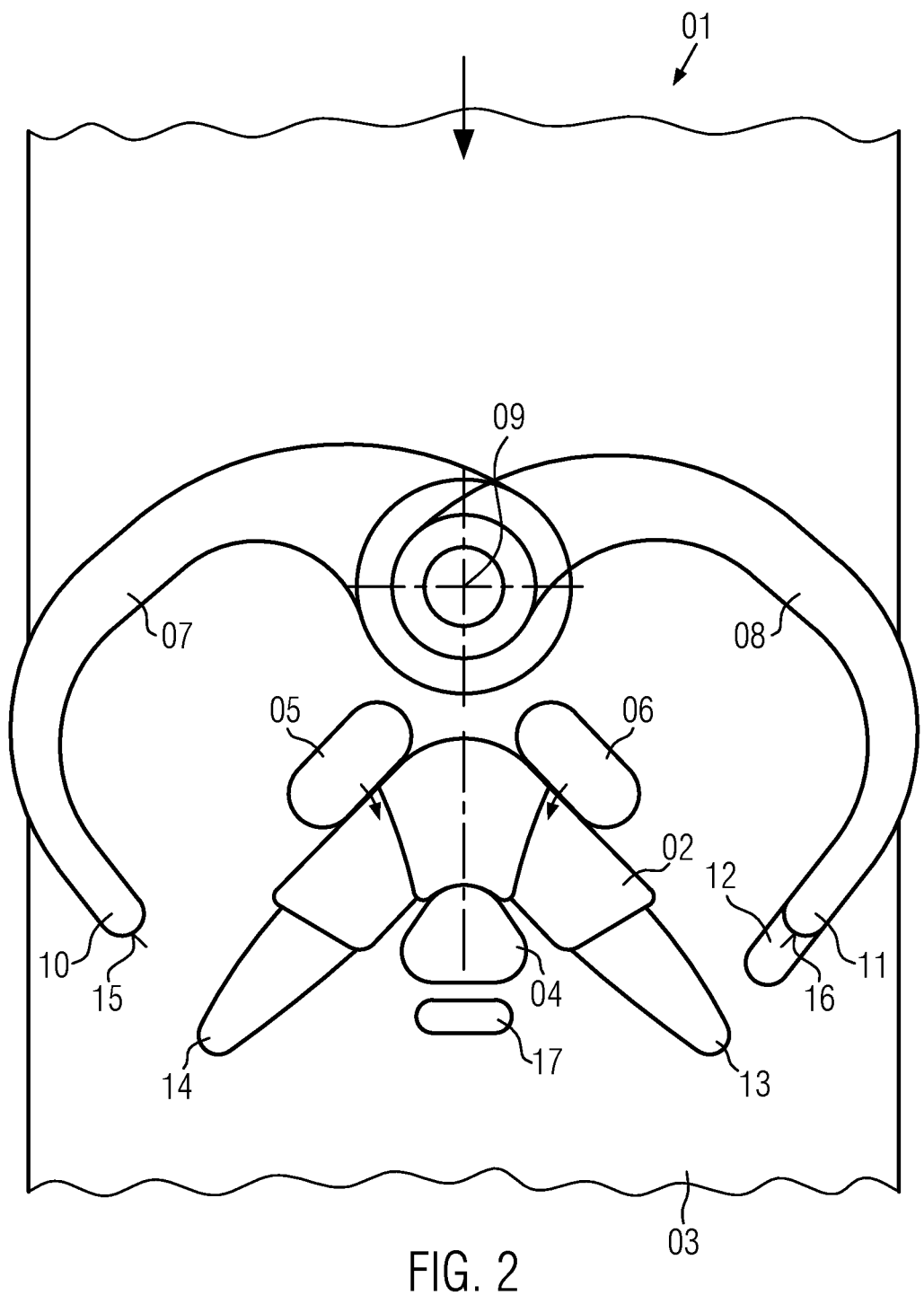
FIG. 2 shows the device according to FIG. 1 after the dough piece has been pre-bent with two pre-shaping jaws.

FIG. 2 shows the device 01 with the dough piece 02 during pre-shaping of the dough piece 02. To this end, the pre-shaping jaws 05 and 06 are moved into contact with the back of the dough piece 02, so that the dough piece 02 will be bent round the triangular retaining jaw 04 in a bow shape and thus be pre-shaped.

Figure 3:
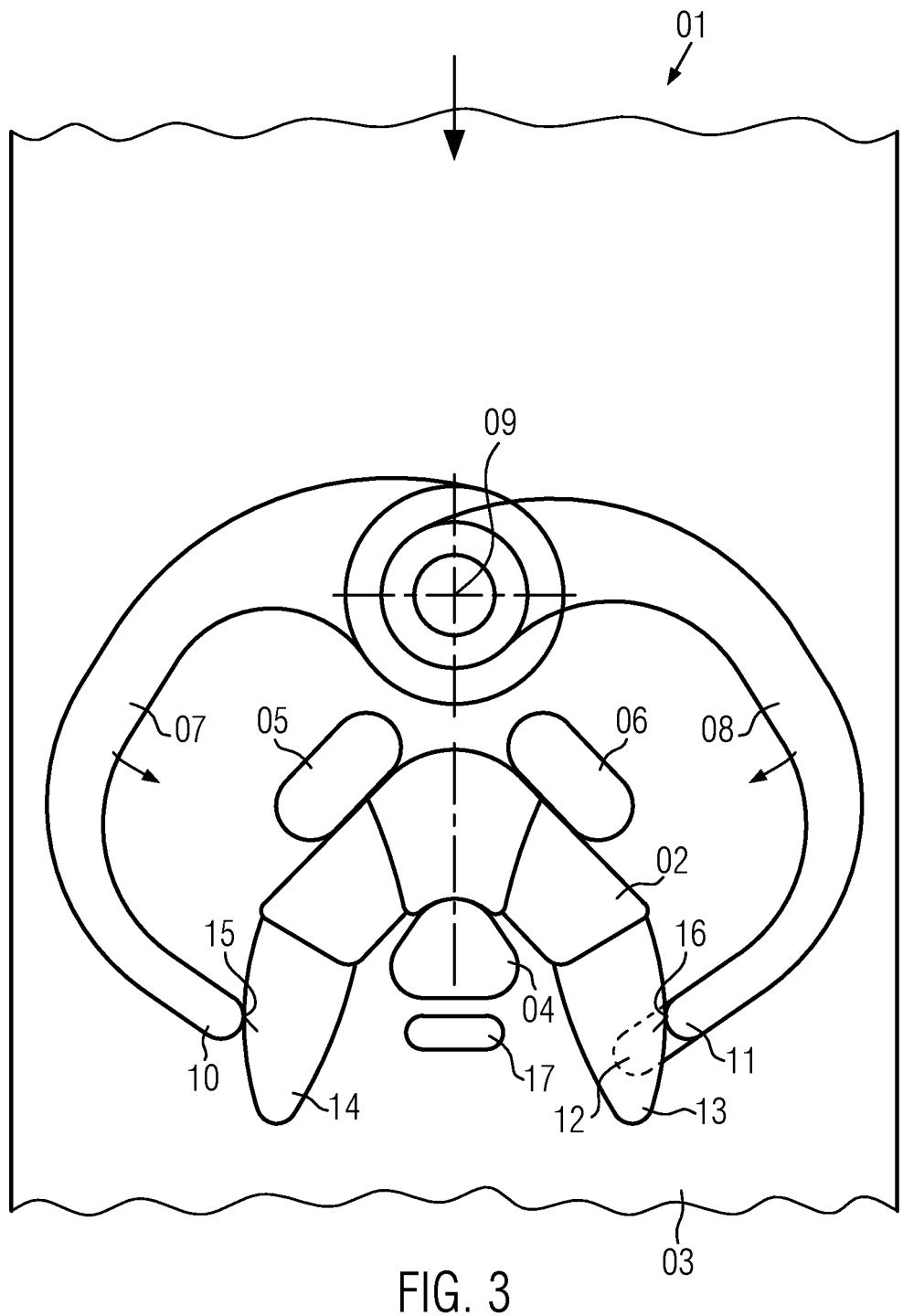
FIG. 3 shows the device according to FIG. 2 after the initial position of the two shaping jaws for annularly bending the dough piece has been reached.

FIG. 3 shows the device 01 with the pre-shaped dough piece 02 after the two shaping jaws 07 and 08 have been pivoted, driven by a drive axle 09, and the free ends 10 and 11 thereof have thus been brought into engagement with the outer side of the dough piece for the first time.

FIG. 3 thus shows the initial position of the two shaping jaws 07 and 08 at the beginning of the displacement path section with which the dough pieces 02 are bent into an annular shape. At this initial position of the displacement path section, the free end 11 is not only in contact with the outer side of the dough piece 02 with its horizontal contact surface. The free end 11 has also provided thereon a protruding projection 12, which, at the initial position of the displacement path section shown in FIG. 3, is pushed under the end 13 of the dough piece 02. The free end 10 of the shaping jaw 07, however, is not provided with a projection, so that, during the subsequent bending into an annular shape, the end 14 of the dough piece will not be lifted, but rest on the conveyor belt 03 instead.

Figure 4:
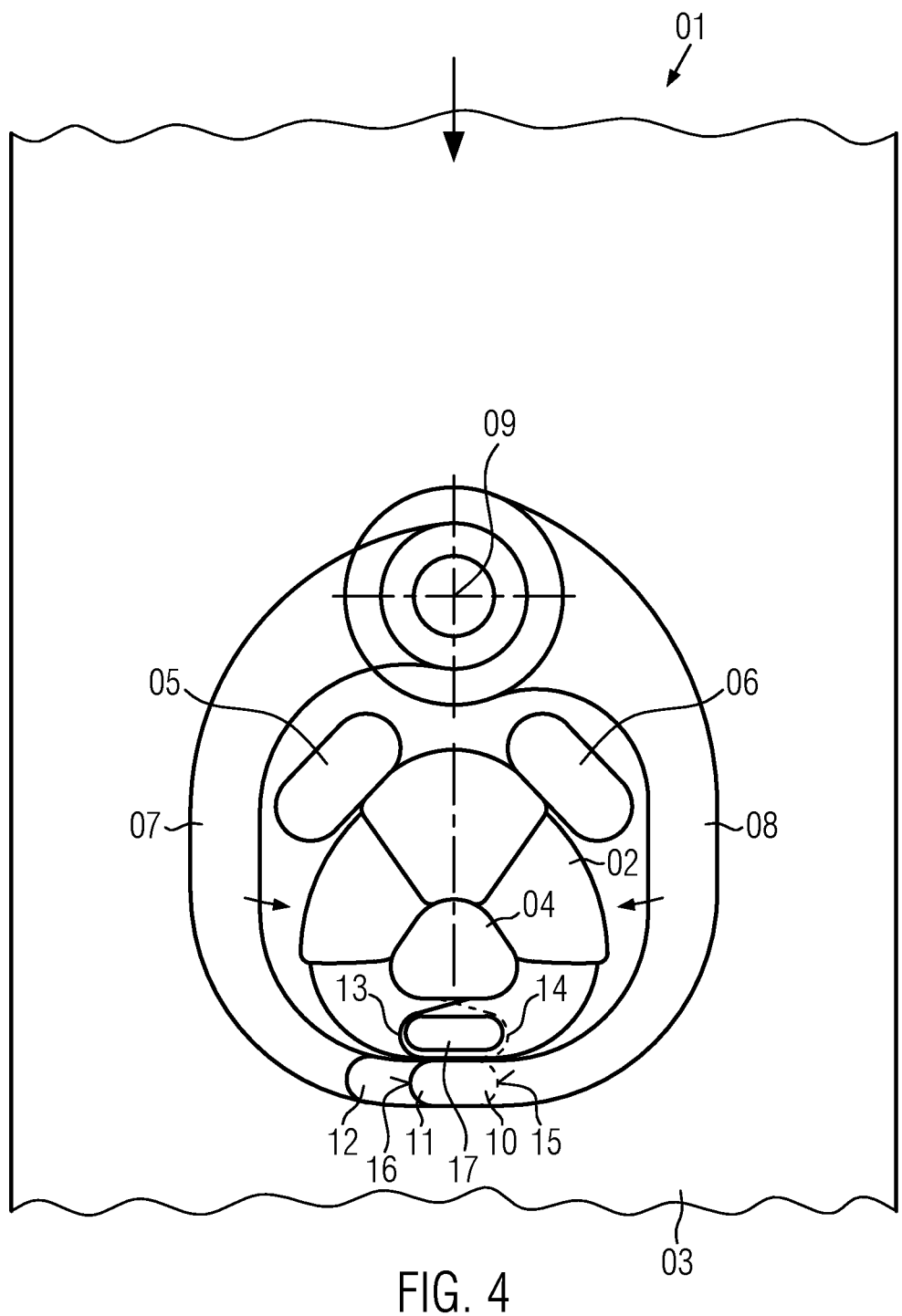
FIG. 4 shows the device according to FIG. 3 after the final position of the shaping jaws has been reached and after the overlapping ends of the dough piece have been stamped.

FIG. 4 shows a device 01 at the final position of the shaping jaws 07 and 08 after the bending of the dough piece 02 into an annular shape has been terminated. The dough piece 02 is here bent annularly around the retaining jaw 04 and the two ends 13 and 14 of the dough piece overlap each other. For this purpose, the shaping jaw 08 had been vertically lifted during the displacement of the initial position shown in FIG. 3 along the displacement path until the final position shown in FIG. 4 had been reached, so that the end 13 of the dough piece 02 was arranged above the end 14 thus allowing the overlapping arrangement of the ends 13 and 14. Along the displacement path section between the initial position and the final position shown in FIG. 3 and FIG. 4, the dough piece 02 was annularly bent around the retaining jaw 04 by displacing the shaping jaws 07 and 08. The free ends 10 and 11 of the two shaping jaws 07 and 08 have provided thereon sliding surfaces 15 and 16, which roll or slide on the surface of the dough while the shaping jaws 07 and 08 are being displaced between the initial position and the final position. By means of this combined advance-sliding and rolling movement it is accomplished that, at the final position shown in FIG. 4, the projection 12 is no longer in contact with the lower surface of the dough end 13. Instead, the projection 12 extends parallel to the ends 13 and 14, which are arranged in an overlapping mode, at the final position shown in FIG. 4. At this final position, a stamp 17 can then be moved vertically downwards, so that the two ends 13 and 14 will be pressed together between the lower surface of the stamp 17 and the upper surface of the conveyor belt 03, so as to guarantee the annular shape of the dough piece 02 in this way.

Figure 5:
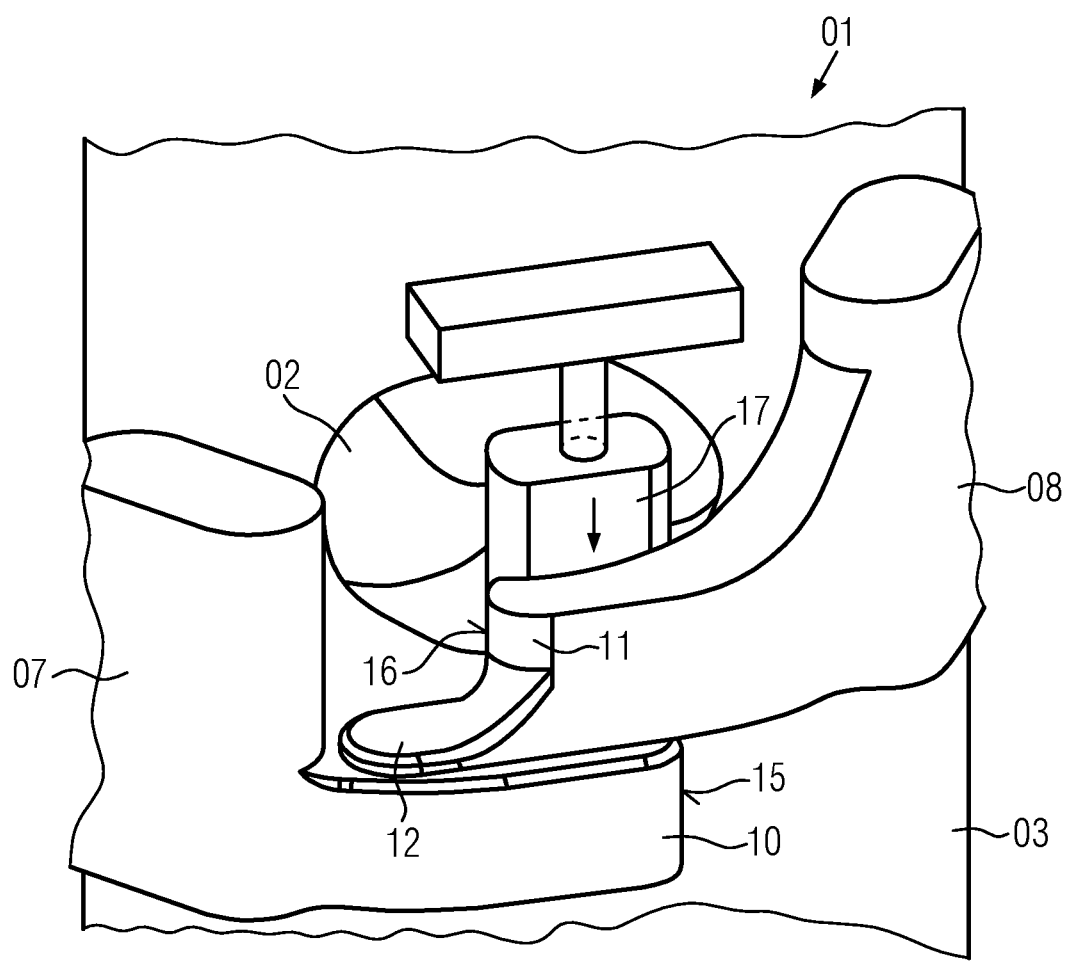
FIG. 5 shows the device according to FIG. 4 in a simplified perspective side view.

FIG. 5 shows the device 01 with the two shaping jaws 07 and 08 at the end position shown in FIG. 4. For better recognizability, the two pre-shaping jaws 05 and 06 are not shown in FIG. 5. It can be seen that, at the final position, the two shaping jaws 07 and 08 are arranged one above the other and extend parallel to the annularly bent ends 13 and 14 of the dough piece 02. Since the projection 12 thus no longer comes to lie between the two ends 13 and 14 of the dough piece 02, the dough piece can be compressed interference-free in the area of the ends 13 and 14 by vertically displacing the stamp 17.

Figure 6:
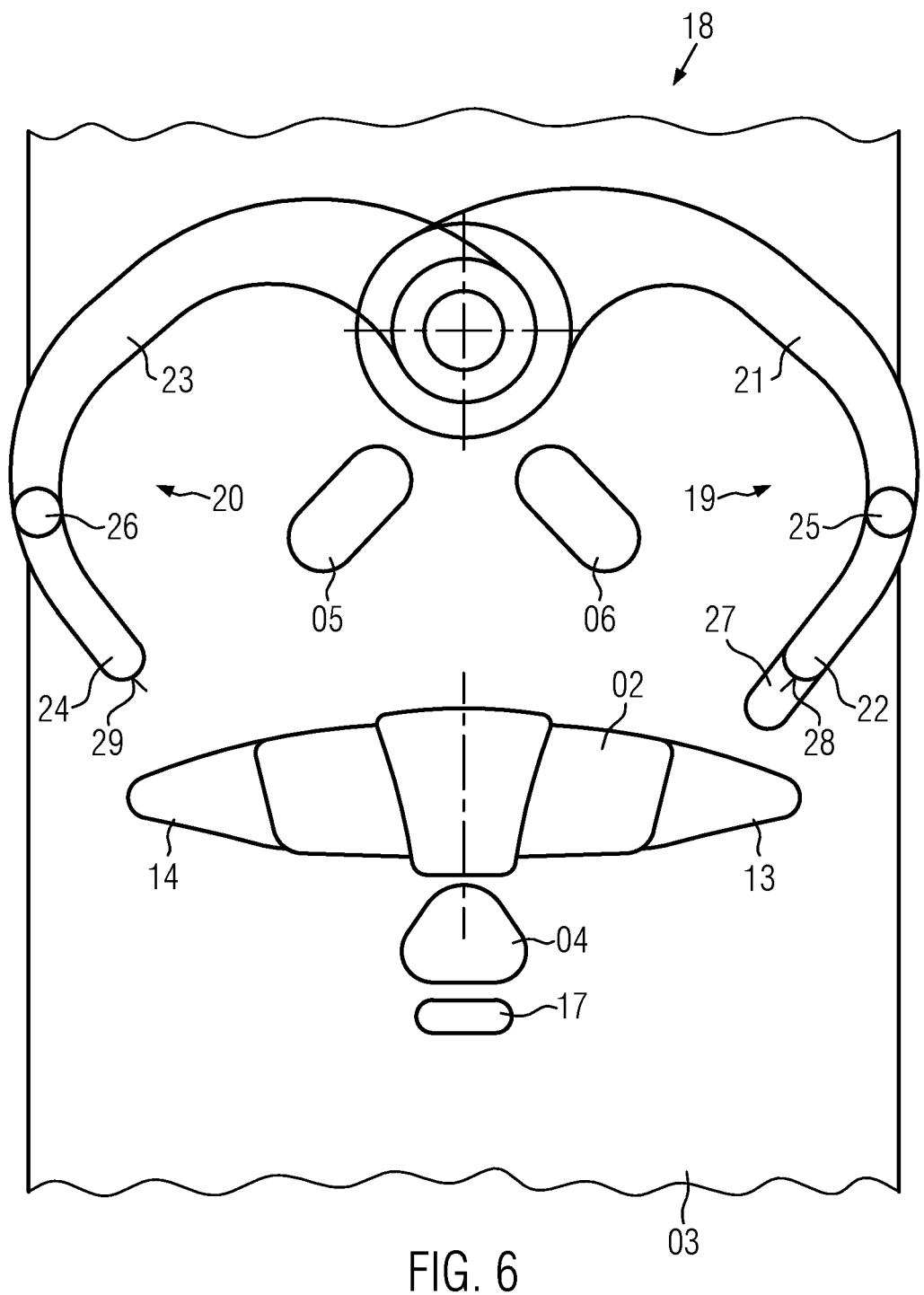
FIG. 6 shows, in a top view, a second embodiment of a device according to the present invention before the bending process starts.
Figure 7:
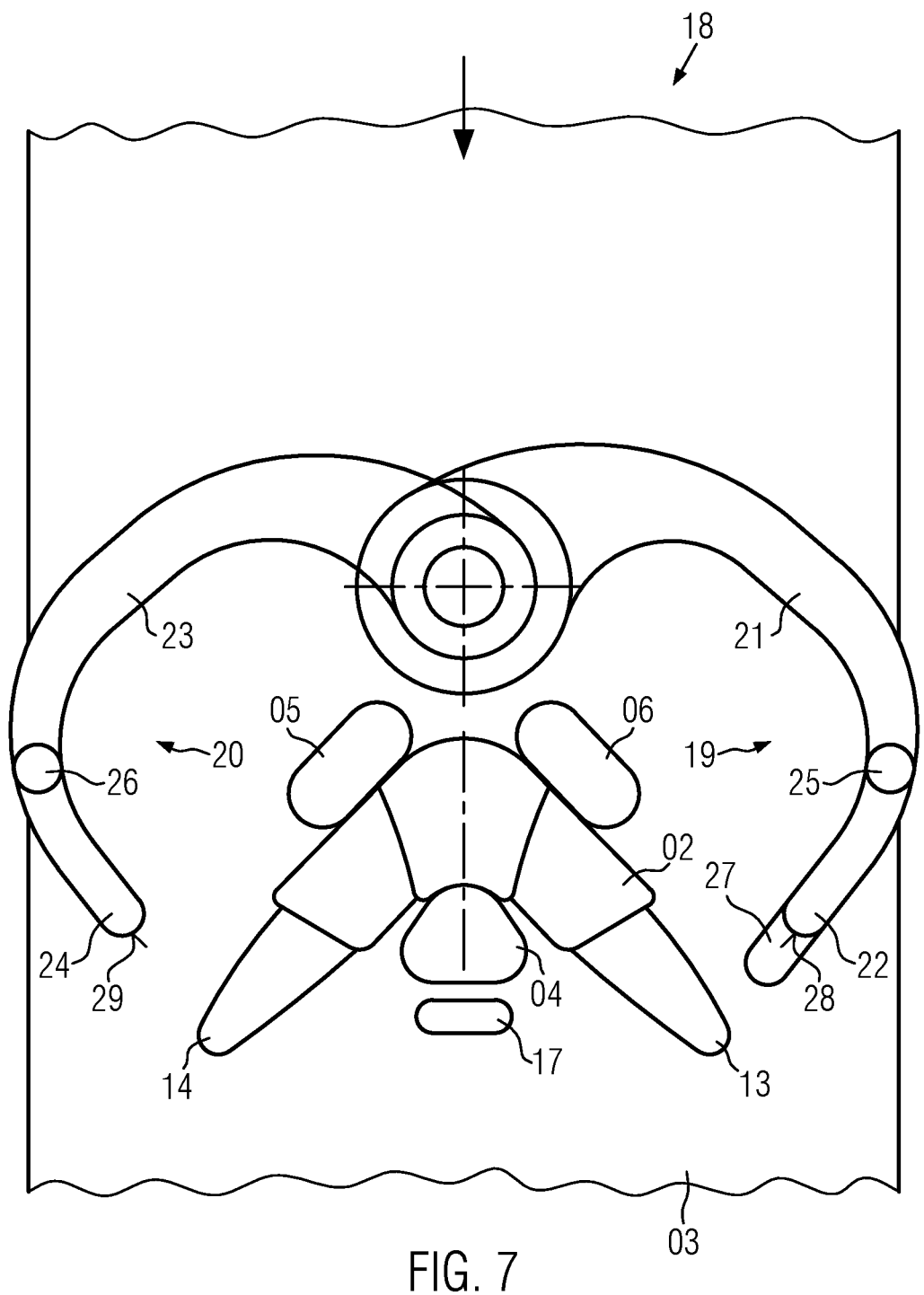
FIG. 7 shows the device according to FIG. 6 after the dough piece has been pre-bent with two pre-shaping jaws.
Figure 8:
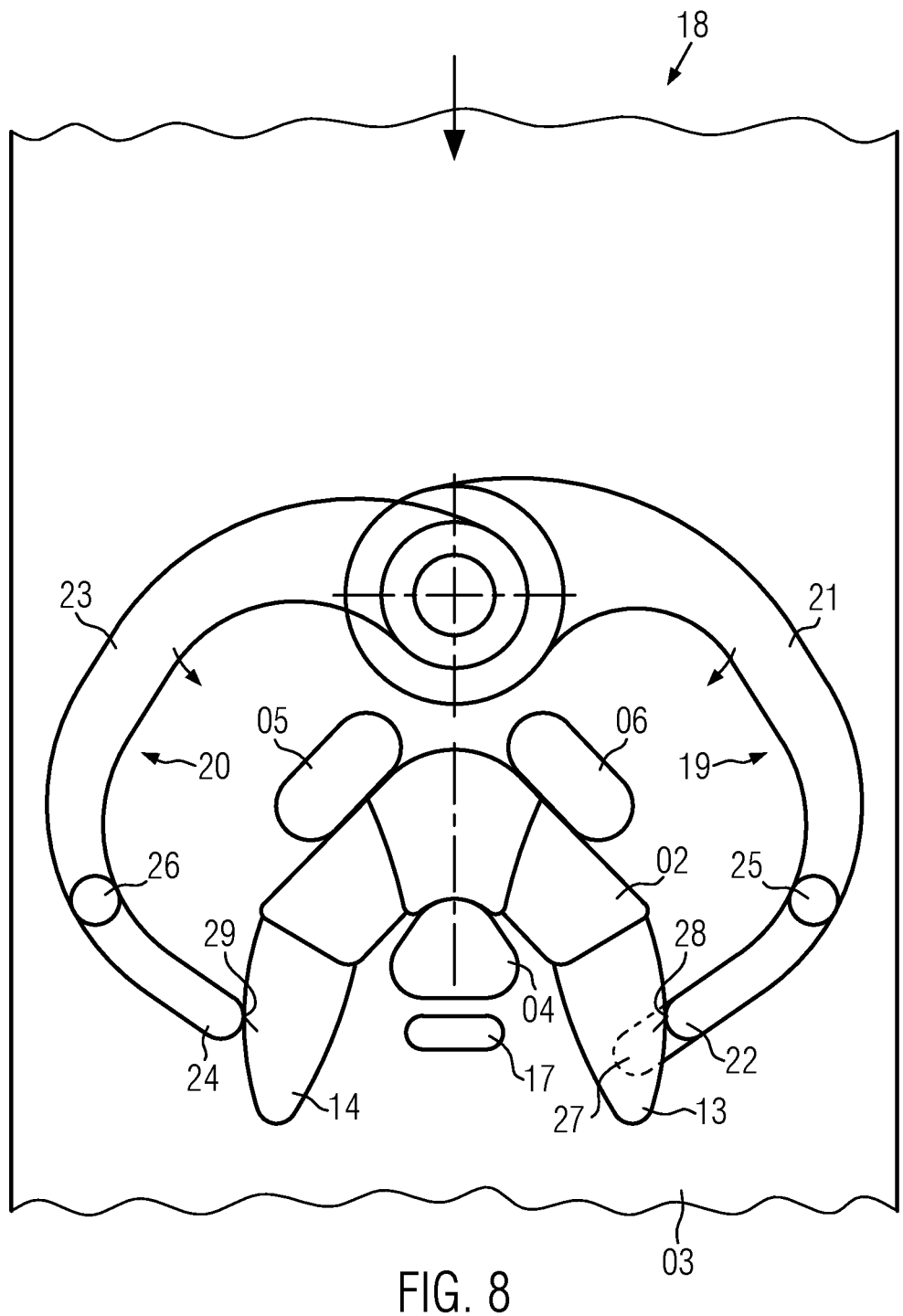
FIG. 8 shows the device according to FIG. 7 after the initial position of the two shaping jaws for annularly bending the dough piece has been reached.
Figure 9:
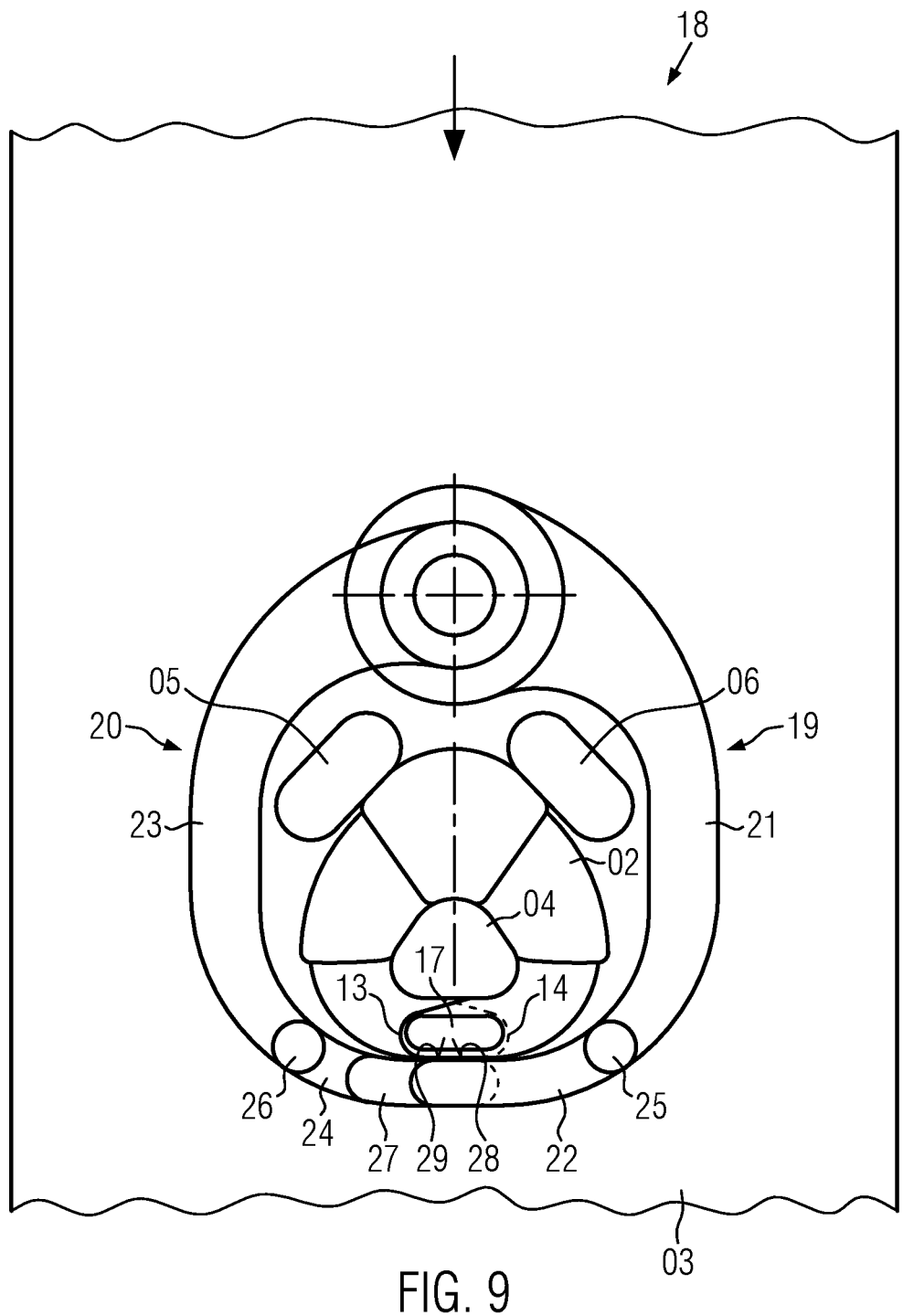
FIG. 9 shows the device according to FIG. 8 after the final position of the shaping jaws has been reached and after the overlapping ends of the dough piece have been stamped.

FIG. 6 shows a second embodiment 18 of a device 18 according to the present invention used for annularly bending dough pieces 02, e.g. wound croissants. The device 18, which largely corresponds to the device 01, differs from the latter with respect to the structural design and the function of the two shaping jaws 19 and 20. The shaping jaws 19 and 20 are each bipartite and composed of two parts 21 and 22 or 23 and 24. The front part 22 of the shaping jaw 20 has again provided thereon a projection 27 for lifting the end 13 of the dough piece 02. The respective second parts 22 and 24 of the shaping jaws 19 and 20 are pivotable by means of a drive unit, which is not shown, relative to the respective first parts 21 and 23 of the shaping jaws 19 and 20 about the pivot axes 25 and 26. The respective second parts 22 and 24 of the shaping jaws 19 and 20 are engageable, each with a respective sliding surface, with the dough piece 02.

The drawings according to FIG. 6 to FIG. 10 show schematically the mode of operation of the device 18 in the process of annularly bending dough pieces 02 that are initially wound straight. As can be seen from FIG. 6 to FIG. 9, the mode of operation of the device 18 corresponds, until the final position of the displacement path section for annularly bending a dough piece 02 has been reached, to the mode of operation of device 01 as shown in FIG. 1 to FIG. 4.

Figure 10:
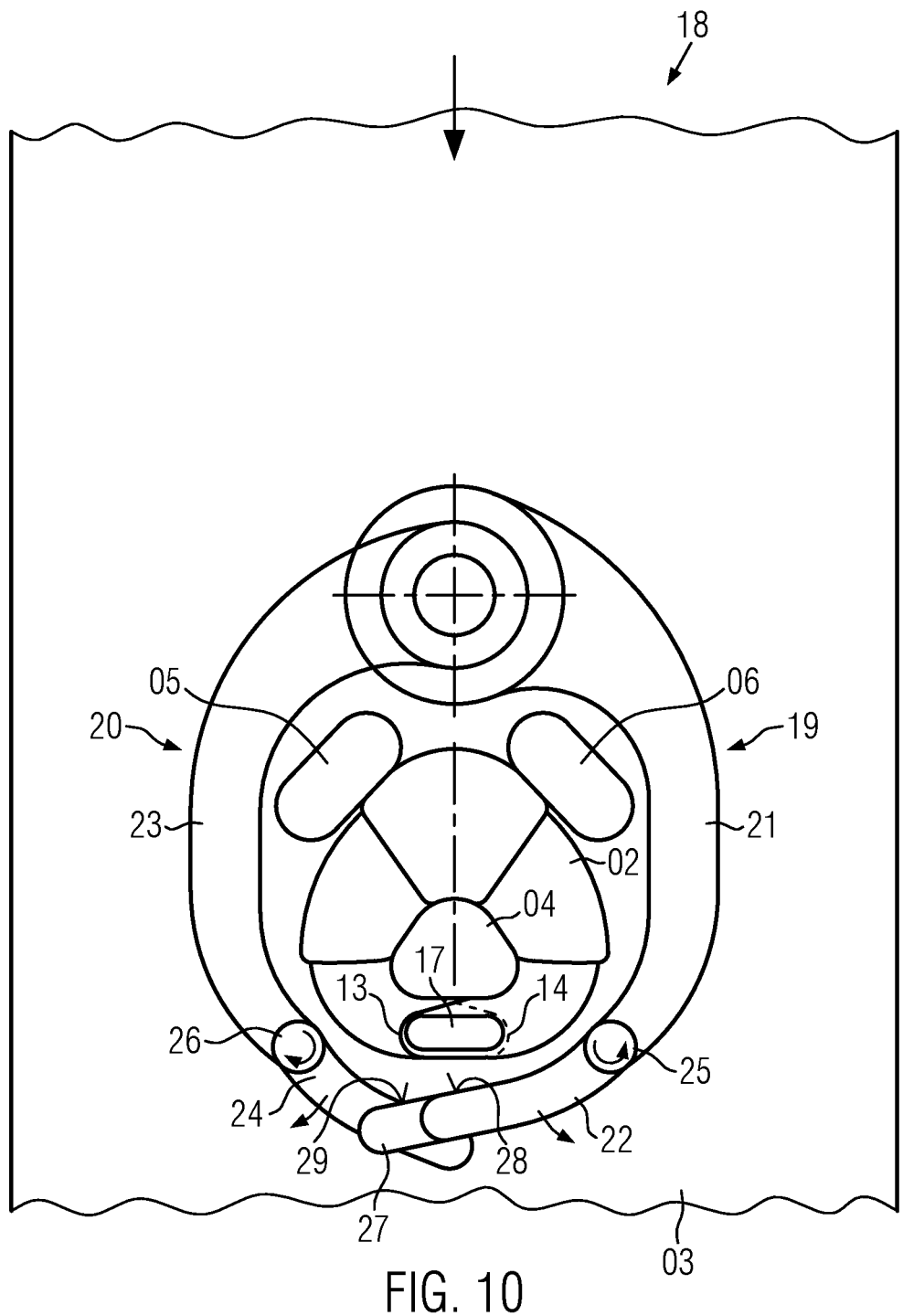
FIG. 10 shows, in a simplified perspective side view, the device according to FIG. 9 during opening of the shaping jaws.

FIG. 10 shows the mode of operation of the device 18 after the final position of the displacement path section for annularly bending the dough piece 02 has been reached. In order to allow the shaping jaws 19 and 20 to be released from the dough piece 02 without damaging the dough surface, the respective front part 22 and 24 of the shaping jaws 19 and 20 is driven separately and thus pivoted away from the dough piece 02, without any setting movement of the rear parts 21 and 23 of the shaping jaws 19 and 20 taking place. The sliding of the shaping jaws 19 and 20 over the dough piece, which is desired during the closing of the shaping jaws 19 and 20, is thus avoided during the opening of the shaping jaws 19 and 20. Instead, the sliding surfaces 28 and 29 of the shaping jaws 19 and 20 are brought out of engagement with the dough piece 02 with a jerk.

The invention claimed is:

1. A device for forming a substantially straight dough piece into an annular shape, comprising a bending unit for annularly bending the dough piece, the bending unit comprising:
    a retaining jaw, which is adapted to be brought into contact with an inner side of the dough piece,
    and two movably supported shaping jaws, which are adapted to be brought into engagement with an outer side of the dough piece, wherein the dough piece can be annularly bent around the retaining jaw by driving the shaping jaws,
    wherein one shaping jaw is liftable relative to the other shaping jaw, and the one shaping jaw has provided thereon a projection which, when the one shaping jaw is in contact with the dough piece, is configured to contact a lower surface of the dough piece, and the projection is adapted to be lifted so as to lift a first end of the dough piece, which rests on the projection, and arrange the first end on a second end of the dough piece so that the first end overlaps the second end,
    and a stamp that is operable to press the overlapped first and second ends of the annularly bent dough piece against each other,
    wherein, while being in engagement with the dough piece, the one shaping jaw provided with the projection is displaceable along a displacement path section between an initial position, in which the projection is in contact with the lower surface of the dough piece, and a final position, in which the projection has been brought out of engagement with the dough piece, and wherein the projection of the one shaping jaw overlaps the other shaping jaw when the one shaping jaw is in the final position.

2. The device according to claim 1,
    wherein
    the projection protrudes beyond a free end of the one shaping jaw, wherein the projection extends transversely to a center axis of the dough piece at the initial position, and wherein the projection extends parallel to the center axis of the dough piece at the final position.

3. The device according to claim 2, wherein at the final position of the one shaping jaw, a distance between the shaping jaws, which are in contact with the dough piece, and a back of the retaining jaw corresponds to a width of the ends of the dough piece.

4. The device according to claim 1,
    wherein
    the shaping jaws each have a sliding surface configured to enter into engagement with the dough piece, the sliding surfaces configured to slide and/or roll on a surface of the dough piece while they are in engagement with the dough piece along the displacement path section.

5. The device according to claim 1,
    wherein
    the shaping jaws are each bipartite, wherein a second part of each shaping jaw is pivotable relative to a first part of the shaping jaw, and wherein the second part of each shaping jaw is adapted to enter into engagement with the dough piece with a sliding surface thereof, and wherein the shaping jaws are adapted to be brought out of engagement by pivoting the second parts.

6. The device according to claim 1,
    wherein
    the device comprises two pre-shaping jaws, which are adapted to be brought into engagement with the outer side of the dough piece, wherein the substantially straight dough piece can be bent round the retaining jaw in a bow shape by driving the pre-shaping jaws.

7. The device according to claim 1,
    wherein
    the retaining jaw is round or triangular in cross-section and/or that the retaining jaw tapers in a downward direction.

8. The device according to claim 1,
wherein
the bending unit in its entirety or the shaping jaws and/or the retaining jaw and/or two pre-shaping jaws and/or the stamp is/are replaceably fixed to the device.

9. The device according to claim 1,
wherein
the device comprises a position sensor with an evaluation unit, the position sensor being able to detect position of the dough piece.

10. A method for forming a substantially straight dough piece into an annular shape, the method comprising:
contacting a retaining jaw with an inner side of the dough piece,
contacting two movably supported shaping jaws with an outer side of the dough piece at an initial position of a displacement path section of the two shaping jaws, one of the shaping jaws having provided thereon a projection which is configured to contact a lower surface of the dough piece;
displacing the shaping jaws along the displacement path section until the shaping jaws reach a final position to bend the dough piece, the shaping jaw provided with the projection being lifted along the displacement path section, so as to lift a first end of the dough piece and arranging the first end on a second end of the dough piece so that the first end overlaps the second end, wherein the projection is pivoted relative to the dough piece along the displacement path section, wherein the projection is in contact with the lower surface of the dough piece at the initial position, wherein the projection has been brought out of engagement with the dough piece at the final position, and wherein the projection of the one shaping jaw overlaps the other shaping jaw when the shaping jaws are in the final position; and
displacing a stamp to press the overlapped first and second ends of the dough piece against each other.

11. The method according to claim 10,
wherein
while being in engagement with the dough piece, the shaping jaws slide and/or roll on a surface of the dough piece with a respective sliding surface thereof.

12. The method according to claim 10,
wherein,
by driving two pre-shaping jaws, the substantially straight dough piece is bent relative to the retaining jaw in a bow shape, and, subsequently, the dough piece is annularly bent around the retaining jaw by driving the two shaping jaws.

13. The method according to claim 10, wherein during the displacement of the stamp, the shaping jaws are moved apart starting from the final position.

14. The method according to claim 13,
wherein
the shaping jaws are each bipartite, wherein a second part of each shaping jaw can be pivoted relative to a first part of the shaping jaw, and wherein the second part of each shaping jaw enters into engagement with the dough piece with a sliding surface thereof between the initial position and the final position of the displacement path section, and wherein, after having reached the final position of the displacement path section, the second part of each shaping jaw is pivoted relative to the first part of the shaping jaw, so as to bring the sliding surfaces out of engagement with the dough piece.

15. The device according to claim 5 further comprising a drive unit that is operable to pivot the second part of each shaping jaw with respect to the first part of the shaping jaw.

16. The device according to claim 7, wherein the retaining jaw is configured conically.

17. The device according to claim 9, wherein the position sensor comprises a camera.

18. The device according to claim 1, wherein an end of the one shaping jaw overlaps an end of the other shaping jaw when the one shaping jaw is in the final position.

19. The method according to claim 10, wherein the dough piece is a wound dough piece.

20. The method according to claim 14, wherein the second part of each shaping jaw is pivoted relative to the first part of the shaping jaw during the displacement of the stamp, so as to bring the sliding surfaces out of engagement with the dough piece.

* * * * *